T. L. ALLEN.
FERTILIZER DISTRIBUTER.
No. 10,771. Reissued Oct. 19, 1886.
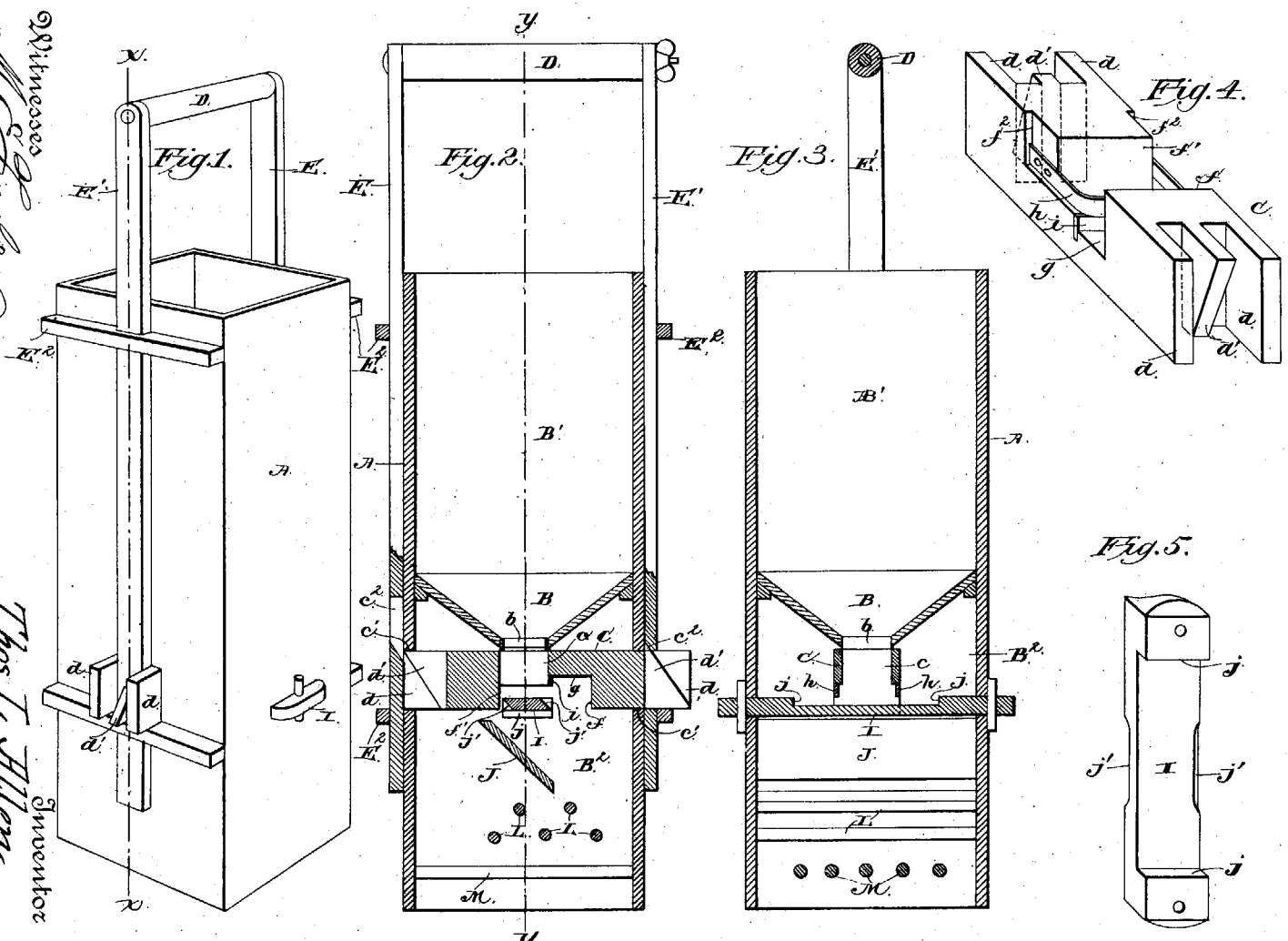
Witnesses
M. E. Fowler
H. L. Deruhas
Inventor
Thos L. Allen,
By his Attorneys
C. A. Snow & Co.
N. PETERS, Photo-Lithographer, Washington, D. C.

UNITED STATES PATENT OFFICE.

THOMAS LEIGHTON ALLEN, OF EAST WINDHAM, MAINE.

FERTILIZER-DISTRIBUTER.

SPECIFICATION forming part of Reissued Letters Patent No. 10,771, dated October 19, 1886.

Original No. 336,373, dated February 16, 1886. Application for reissue filed August 9, 1886. Serial No. 210,473.

*To all whom it may concern:*

Be it known that I, THOMAS LEIGHTON ALLEN, a citizen of the United States, residing at East Windham, in the county of Cumberland and State of Maine, have invented a new and useful Improvement in Fertilizer-Distributers, of which the following is a specification, reference being had to the accompanying drawings.

My invention has relation to improvements in fertilizer-distributers; and it consists of the peculiar construction and combination of parts, substantially as hereinafter fully described, and specifically pointed out in the claims.

The object of my invention is to provide a fertilizer-distributer to be operated by hand and secure an even and regular discharge to each hill, which shall be simple and strong in construction, thoroughly effective in operation, and rapid, which can be adjusted to vary the quantity of fertilizer sown or distributed, which can be readily taken apart for adjustment and repairs, and which can be manufactured very cheaply.

In the drawings, Figure 1 is a perspective view of my improved hand fertilizer-distributer. Fig. 2 is a vertical sectional view on the line *x x* of Fig. 1. Fig. 3 is a similar sectional view of the line *y y* of Fig. 2. Fig. 4 is a detail perspective view of the reciprocating slide or cut-off. Fig. 5 is a detail perspective view of the adjustable stop.

Referring to the drawings, in which like letters of reference indicate corresponding parts in all the figures, A designates the inclosing case or shell of my improved hand fertilizer-distributer, which has open ends, and is provided with a horizontal transverse partition, B, secured therein at or near its middle, and dividing the shell or casing into two compartments, $B'$ $B^2$. The upper compartment, $B'$, serves as a hopper in which the fertilizer or other substance to be distributed is deposited, while the lower compartment receives the distributing devices for evenly distributing the fertilizer on its passage from the hopper to the ground. The partition or bottom of the hopper B is made sloping from all sides toward its middle, and is provided with a discharge-opening, *b*, through which the fertilizer passes.

C designates a reciprocating slide or cut-off, arranged beneath the bottom of the hopper, and having an opening, *c*, which successively registers and is thrown out of coincidence with the opening *b* of the hopper-bottom when the slide or cut-off is reciprocated to permit the passage of the fertilizer therethrough and cut off the supply from the hopper. The ends of the reciprocating slide C bear in openings $c'$ in the walls of the casing or shell A, and are each provided with three arms or projections, $d\,d\,d'$, which serve, in connection with vertically-moving handle-bars, to operate the slide back and forth, as will presently more fully appear.

D designates the handle, arranged above the case A and secured to handle-bars E $E'$, which are arranged on opposite sides of the case A, and slide between guide-bars $E^2$, secured to said case A above and beneath the reciprocating slide C. The arms *d d* of the outer ends of the reciprocating slide have the handle-bars E $E'$ arranged between them, and serve as guides to said bars, while the arms $d'$ of said slide are beveled in opposite directions, and project through slots $c^2$ $c^2$ in said handle-bars, which successively operate to move the slide back and forth when they are moved up and down. The beveled arms $d'$ of the slide thus serve as cams to reciprocate the same, one of the arms being beveled downwardly and outwardly from its upper inner edge to its lower outer edge, and the slot $c^2$ of the handle-bar $E'$ has its upper wall beveled in opposite directions, (see Fig. 2,) so that when the said bar $E'$ descends, the beveled surface of the slot is brought into contact with the beveled arm $d'$, to force the slide in one direction, the two surfaces sliding upon each other easily and freely with a minimum of friction and wear. The opposite beveled arm of the slide that is acted on by the handle-bar E is beveled from its outer upper edge inwardly and downwardly, and the lower wall of the slot $c'$ of said bar is beveled in the reverse direction, for the purpose of decreasing friction on the parts in contact. It will thus be seen that when the handle-bars are drawn upwardly the bar E is brought into engagement with one of the beveled arms $d'$ of the slide C, and forces the same inwardly to bring the aperture *c* thereof to register with the opening *b* in the hopper-bottom, to permit the discharge of the fertilizer into the said opening *c*, where it is held by the reversible stop, hereinafter described, and when the handle-bars are forced downwardly the bar E serves to force the slide in the opposite direction, to throw the apertures thereof out of coincidence with the opening of the hopper-bottom to cut off the discharge, and force the fertilizer from and beyond the upper surface of said stop, said slide being thus successively or alternately brought into position or engagement with the handle-bars E and E′ to reciprocate the same.

The under surface of the reciprocating slide is cut away at the point where the discharge port or opening *c* is formed therein, thus forming two shoulders, *f f′*, at each side, and at or near its middle. Immediately to one side of the discharge-port *c* is another cut-away portion, *g*.

*h* designates a removable band, arranged immediately beneath the discharge-port *c*, and depending downwardly from the lower surface of the surrounding walls thereof, the ends of said band being secured to recessed portions $f^2$ of the shoulder *f′* by screws or otherwise.

*i* designates a transverse strip, arranged at one side of the discharge-opening *c* of the slide, to clear away the fertilizer, which is liable to accumulate and clog upon the adjustable stop-bar I, presently described.

The adjustable stop bar or plate I is arranged transversely across the reciprocating slide *c*, between the shoulders *f f′* thereof, and at its ends said stop I is supported in the walls of the case A by any suitable or preferable means. The outer ends of said bar or stop are provided with shoulders *j* on one surface thereof, and the side edges of the said bar are beveled off in opposite directions, as at *j′*.

J designates an inclined dividing-board secured in the walls of the case beneath the stop I, to divide and properly guide or direct the fertilizer to the ground.

L designates diagonally-arranged cross-bars secured in the case A, near its lower end, beneath the inclined dividing-board, and M is a series of parallel cross-bars arranged below and transversely of the diagonal cross-bars, said parallel and diagonal cross-bars serving to thoroughly and evenly distribute the fertilizer falling thereon from the hopper and dividing-board.

To drop or sow a small quantity of fertilizer from the hopper, the band *h* is removed from the reciprocating slide, and the stop-bar J is adjusted in the case A, so that its shoulders *j* will bear against the lower edges of the opening *c′* therein, and the notches or recess at the middle of the bar will be lowermost while the flat side thereof is uppermost, thus causing the upper edges of the said stop-bar to lie above the plane of the lower edges of the shoulders *f f′* of the reciprocating slide. When the bar and slide are thus adjusted for use, and the handle D is lifted, the shoulder *f′* of the slide abuts against the edge of the stop-bar, which is beveled on its under surface to prevent clogging. The port *e* is thus closed on its under surface and made to register with the opening *b* in the hopper-bottom, and a space is provided and filled with fertilizer equal to the size of the port *e* for one charge or pile, and when the handle D is pushed downward the fertilizer is carried across the level surface of the stop, and the port *e* registers with the lower compartment, $B^2$, where it falls on the distributing devices and is carried to the ground, and at the same time the shoulder *b* of the slide abuts against the stop-bar, thus limiting the movement of the slide, and also acting as a stop to hold the fertilizer in the machine when lifted from the ground.

To increase the quantity of the fertilizer discharged from the hopper the stop-bar J is reversed from the position above described, so that the recess or opening at the middle thereof lies uppermost, and the shoulders *j* bear against the upper edges of the opening *c′* of the case, and the band *h* is secured to the shoulders *f′* of the reciprocating slide within the recesses $f^2$ thereof, and surrounding the opening *c* therein. An enlarged space is thus provided equal to the side of the surface of the ports *e* and width of the band *h*, and the band effectually clears and scrapes all fertilizer from the upper face of the bar and forces it therefrom, so that it falls by gravity down through and out of the case. It will thus be seen that when a small quantity of fertilizer is to be discharged the band *h* is removed and the stop-bar J is adjusted so that its flat side is uppermost and lies in the plane of the lower edges of the shoulders *f f′* of the slide, and the strip *i* thereon clears the bar from any fertilizer that may rest thereon, thus preventing the accumulation of the material on the stop-bar, and when a greater quantity of fertilizer is to be discharged the band *h* is adjusted or secured in place and the stop-bar J reversed, so that the shoulders *j* and the recessed portion thereof lie uppermost, to provide an enlarged space, the band *h* serving to clear the fertilizer from the upper face of the stop-bar and prevent it from accumulating thereon.

The operation of my invention is obvious: The fertilizer is first placed in the hopper and the handle grasped by the operator. The lower open end of the case A is set on the ground at the place where the fertilizer is to be deposited, and the handle or bars E are pressed downwardly, thus causing the discharge-port of the slide to register with the opening in the bottom and permitting the fertilizer to escape and fall down on the edge of the inclined dividing-board, and is divided into equal parts on either side, and from thence to the distributing-bars L M. The case or shell A is now lifted from the ground by pulling upward on the handle D, and the weight of the device and pull on the handle-bars serve to force the slide back to its normal position, so that the discharge is cut off until the device is again rested on the ground and the handle depressed.

The handle D is removably secured to the bars E E′ by means of a headed through-bolt, N, and a thumb-screw, N′, to permit said bars E E′ to be readily detached from said handle to permit the slide C to be removed from the case A, for the purpose of removing or attaching the band *h* when it is desired to vary the quantity of fertilizer to be distributed.

The discharge-opening *b* of the hopper-bottom has a clearing-strip, *o*, to prevent the substance or fertilizer from clogging on the upper surface of the reciprocating slide, and said discharge-opening is further provided on its opposite side with a flexible or elastic strip, *p*, to prevent a bone or other hard unyielding substance in the fertilizer from injuring the slide or bottom of the hopper, and preventing it from working. When a bone or other hard substances in the fertilizer clogs up the opening therein, the elastic strip will yield when the reciprocating slide is operated and thus permit the bone, &c., to pass through the hopper or become discharged.

Having thus fully described my invention, what I claim as new, and desire to secure by Letters Patent, is—

1. The combination of a case having a hopper, a transverse slide arranged beneath the same, and vertically-moving handle-bars loosely mounted on the case and adapted to reciprocate the slide when they are moved up and down, substantially as described.

2. The combination of a case having a hopper, a reciprocating slide mounted in the case and arranged beneath the discharge-opening of the hopper-bottom, said slide having guide and cam arms at its ends, and slotted handle-bars alternately engaging the cam-arms of the slide to reciprocate the same, substantially as described.

3. The combination of a case having a hopper, a transversely-moving slide having limiting shoulders or stops, vertically-moving handle-bars to operate said slide, and a transverse stop-bar to limit the movement thereof, substantially as described.

4. The combination of a case having a hopper, a reciprocating slide having limiting-shoulders, vertically-moving handle-bars to operate the slide, and a reversible stop-bar to limit the movement of the slide and vary the quantity of material discharged, substantially as described.

5. The combination of a case having a hopper, a reciprocating slide, a removable band, *h*, secured thereto, vertically-moving handle-bars to operate the slide, and a stop-bar to limit the movements of the slide, substantially as described.

6. The combination of the case having a hopper, a reciprocating slide, handle-bars for operating the same, a removable band, *h*, secured to and surrounding the discharge-opening of the slide, and a reversible stop-bar adapted to limit the movement of the slide, substantially as described.

7. The combination of the case having a hopper, a horizontally-movable slide, vertically-movable handle-bars connected with the slide and adapted to reciprocate the same, a transverse bar for limiting the movement of the slide, an inclined dividing-board, located beneath the slide and supported on or near the middle of the case, and separating-bars arranged below the dividing-board, substantially as described.

8. The combination, with the case having a hopper, a movable slide having an opening, and a detachable band, *h*, surrounding said opening, a reversible transverse bar for limiting the movement of the slide and having offsets at its ends, vertically-movable handle-bars for operating the slide, an inclined dividing-board, and separating-bars located below the dividing-board, substantially as described.

THOMAS LEIGHTON ALLEN.

Witnesses:
JOSIAH H. DRUMMOND, Jr.,
CHARLES H. MCKUSICK.